United States Patent
Elliott et al.

(10) Patent No.: US 9,540,507 B2
(45) Date of Patent: *Jan. 10, 2017

(54) COMPOSITION FOR MAINTAINING GOOD COLOR WHEN THERMALLY TREATING POLYESTER-POLYAMIDE BLENDS

(71) Applicant: M&G USA Corporation, Apple Grove, WV (US)

(72) Inventors: Guliz Arf Elliott, Northfield Center, OH (US); Paul Heater, Navarre, OH (US); Ricardo Knudsen, Sao Paulo (BR); Gerald Orosz, Akron, OH (US); Gianluca Ferrari, Portograuaro (IT)

(73) Assignee: M&G USA Corporation, Apple Grove, WV (US)

( * ) Notice: Subject to any disclaimer, the term of this patent is extended or adjusted under 35 U.S.C. 154(b) by 748 days.

This patent is subject to a terminal disclaimer.

(21) Appl. No.: 13/859,836

(22) Filed: Apr. 10, 2013

(65) Prior Publication Data

US 2014/0308532 A1    Oct. 16, 2014

Related U.S. Application Data

(63) Continuation of application No. 12/196,441, filed on Aug. 22, 2008, now Pat. No. 8,436,080.

(60) Provisional application No. 60/957,705, filed on Aug. 23, 2007, provisional application No. 61/090,744, filed on Aug. 21, 2008, provisional application No. 61/090,865, filed on Aug. 21, 2008.

(51) Int. Cl.
*C08L 67/00* (2006.01)
*B29B 9/06* (2006.01)
*B29B 9/12* (2006.01)

(52) U.S. Cl.
CPC .............. *C08L 67/00* (2013.01); *B29B 9/06* (2013.01); *B29B 9/12* (2013.01); *Y10T 428/31736* (2015.04)

(58) Field of Classification Search
CPC ........................................ C08L 67/00
USPC ........................................ 524/430
See application file for complete search history.

(56) References Cited

U.S. PATENT DOCUMENTS

| 6,861,468 B2 * | 3/2005 | Yoshida ............... C08K 5/005 523/210 |
| 2004/0013833 A1 | 1/2004 | Lee et al. |
| 2005/0261126 A1 * | 11/2005 | Ferrari ................. B29B 9/12 502/326 |
| 2006/0141187 A1 | 6/2006 | Odoristo et al. |
| 2008/0076841 A1 | 3/2008 | Bourgeois et al. |

FOREIGN PATENT DOCUMENTS

| WO | 03080731 A1 | 10/2003 |
| WO | WO 2006/079044 | * 7/2006 |

OTHER PUBLICATIONS

Suneel Bandi, Sanjay Menta, David A. Schiraldi, "The Mechanism of Color Generation poly(ethylene terephthalate)/Polyamide Blends", "Polymer Degradation and Stability", Jan. 19, 2005, pp. 341-348, vol. 88, Publisher: Elsevier.

Suneel A. Bandi, "High-Performance Blends and Composites Part (II) Mechanistic Investigation of Color Generation in PET/MXD6 Barrier Blends", Jun. 12, 2006, pp. 101-135, Publisher: Case Western Reserve University.

* cited by examiner

*Primary Examiner* — Doris Lee
(74) *Attorney, Agent, or Firm* — Edwin A. Sisson, Attorney at Law, LLC; Jeffrey J. Banyas

(57) ABSTRACT

A specially structured article is described which allows products made from the article to undergo a second heating without a dramatic color shift. This permits more recycled products from the material used to make the article.

6 Claims, 2 Drawing Sheets

COMPOSITION FOR MAINTAINING GOOD COLOR WHEN THERMALLY TREATING POLYESTER-POLYAMIDE BLENDS

PRIORITY AND CROSS REFERENCES

This patent application claims priority from U.S. Provisional Patent Application 60/957,705, filed on 23 Aug. 2007; 61/090,744, filed on 21 Aug. 2008; 61/090864, filed on 21 Aug. 2008; and U.S. patent application Ser. No. 12/196,441, filed on 22 Aug, 2008; the teachings of which are incorporated in their entirety.

BACKGROUND

It is known in the industry to disperse a polyamide polymer into a polyester polymer matrix. It is also known that sulfonated polyester polymers will increase the dispersion. It is also known that color bodies may form during the dispersion process and that the use of the lithium salt of the sulfonated polyester polymer reduces the color formation.

These dispersions are used in the packaging industry to create high barrier bottles. What has been observed is that when the bottles are ground up and the dispersion is exposed to a second thermal history, such as drying and re-extrusion, there can be an increase in yellow color.

There exists therefore a need to create a composition or article that has a minimal or reduced increase in yellow color upon the second thermal history, such as would occur during the recycling operation.

SUMMARY

Disclosed in this specification is an article comprising at least 80% by weight of the article of a sulfonated polyester polymer, at least 1% by weight of the article of a polyamide polymer, and a stabilizer; wherein the stabilizer is present at a level of at least 100 parts stablilizer per million parts article, wherein at least some of the stabilizer is present in the polyester polymer phase and the percentage by weight of all the components of the article equal 100%. This article can be in the form of a pellet, a fiber, a strand, a sheet, a film, a perform, a bottle, a ground flake or cube. The sulfonated polyester polymer can be a phthalate polymer or naphthalate polymer and has at least some of its acid moieties derived from a sulfo-phthalic or sulfo-napthalic acid; or some its glycol moieties derived from sulfo-phthalic or sulfo-napthalic glycol with the preferred sulfonated polyester polymer having at least some of its acid units derived from a metal salt of a sulfo-isophthalic acid.

The polyamide used in the article is selected from the group consisting of the repeating unit of amino caproic acid or A-D, wherein A is the residue of a dicarboxylic acid comprising adipic acid, isophthalic acid, terephthalic acid, 1,4-cyclohexanedicarboxylic acid, resorcinol dicarboxylic acid, or naphthalenedicarboxylic acid, or a mixture thereof, and D is a residue of a diamine comprising m-xylylene diamine, p-xylylene diamine, hexamethylene diamine, ethylene diamine, or 1,4 cyclohexanedimethylamine, or a mixture thereof.

The stabilizer used in article stabilizer can be a hindered phenol or phosphate, in particular, pentaerythritol tetrakis (3,5-di-buty-4-hydroxyhydro-cinnamate) CAS number 6683-19-8.

DESCRIPTION

The article of this invention can take virtually any form suitable for being made out of the polyester polymer. This includes pellets, cubes, chopped strands, strands, injection molded forms such as performs, bottles, including bottles made from the performs, sheet, film, and other formed articles.

Of particular interest is the compartmentalized pellet. The words chip, pellet and particle are used interchangeably. Preferred forms and/or sizes for the chips are spherical with preferred diameters of 0.05 cm to 0.3 cm, hemispherical with a preferred maximum cross section of 0.1 cm to 0.6 cm, or right circular cylinders with a preferred diameter of 0.05 mm to 0.3 mm and a length of 0.1 cm to 0.6 cm. The chip is not to be confused with a fiber, which will have a large aspect ratio (long strand to diameter) of at least 15, with the aspect ratio of the chip being less than 15, more preferably less than 10.

U.S. Pat. Nos. 5,627,218 and 5,747,548, and U.S. Non-Provisional patent application Ser. No. 11/130,961 filed May 17, 2005, teach many techniques for manufacturing compartmentalized chips. In one embodiment, there are at least two zones, or regions in the chip, preferably a core and a sheath. In this, and all subsequent embodiments, the core-sheath, as taught by U.S. Pat. No. 6,669,986, is the preferred pellet or chip structure.

Figure 1:
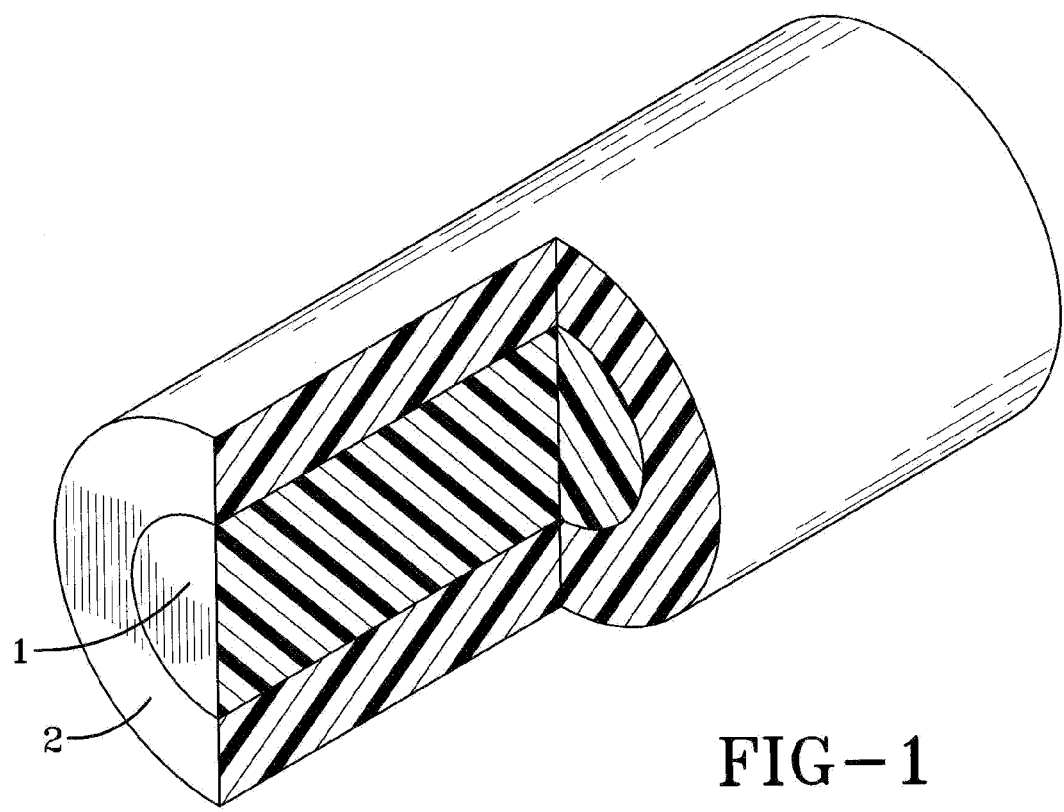
FIG. 1 depicts a resin pellet article with two compartments or zones in the core-sheath configuration.

The core-sheath structure as shown in FIG. 1 can be obtained using two feeders. In FIG. 1, element 1 is the core and element 2 is the sheath. If a third annular ring is desired, an additional feeder may be required. The feeder could be an extruder or a gear pump discharging the polymer from a melt reactor. Any suitable device which can force polymer into a nozzle will work. The first feeder supplies the liquid feed forming the core material which is linearly extruded at the center of the strand. At the same time, the sheath material is extruded in the second feeder into the sheath layer which concentrically covers the core. U.S. Pat. No. 6,669,986 discloses a multiple hole die apparatus to manufacture a core-sheath chip.

Figure 2:
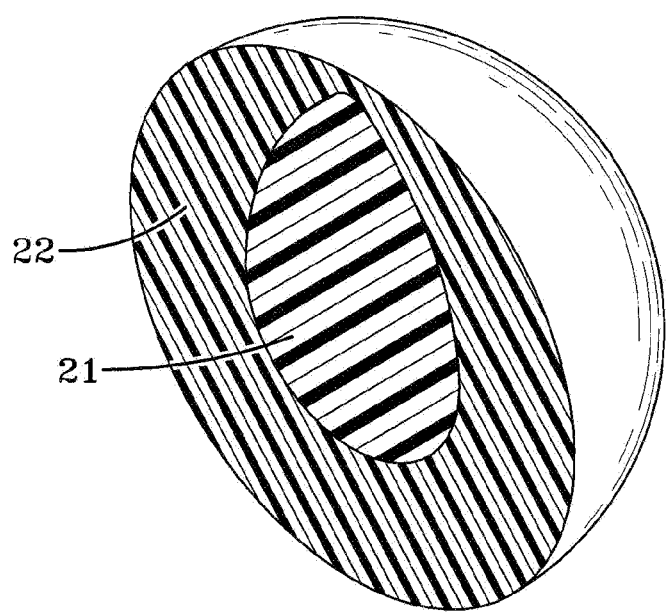
FIG. 2 depicts a resin pellet article with two compartments or zones in the core-sheath configuration where the core is encapsulated, surrounded, or enclosed by an outer sheath layer.

A preferred embodiment as depicted in FIG. 2, is to close the ends of the pellet so the inner core 21 is completely surrounded and enclosed by a sheath 22. U.S. Pat. No. 6,669,986 teaches that this spherical or elliptical or disk-form multilayer chips with the overall circumference including the end face of the core material coated with sheath material can be made by rounding the cut end face. One way to make a chip with an outer layer sheath that encloses the contents of the inner layers is made by cutting the chip strand next to the die underwater.

Figure 4:
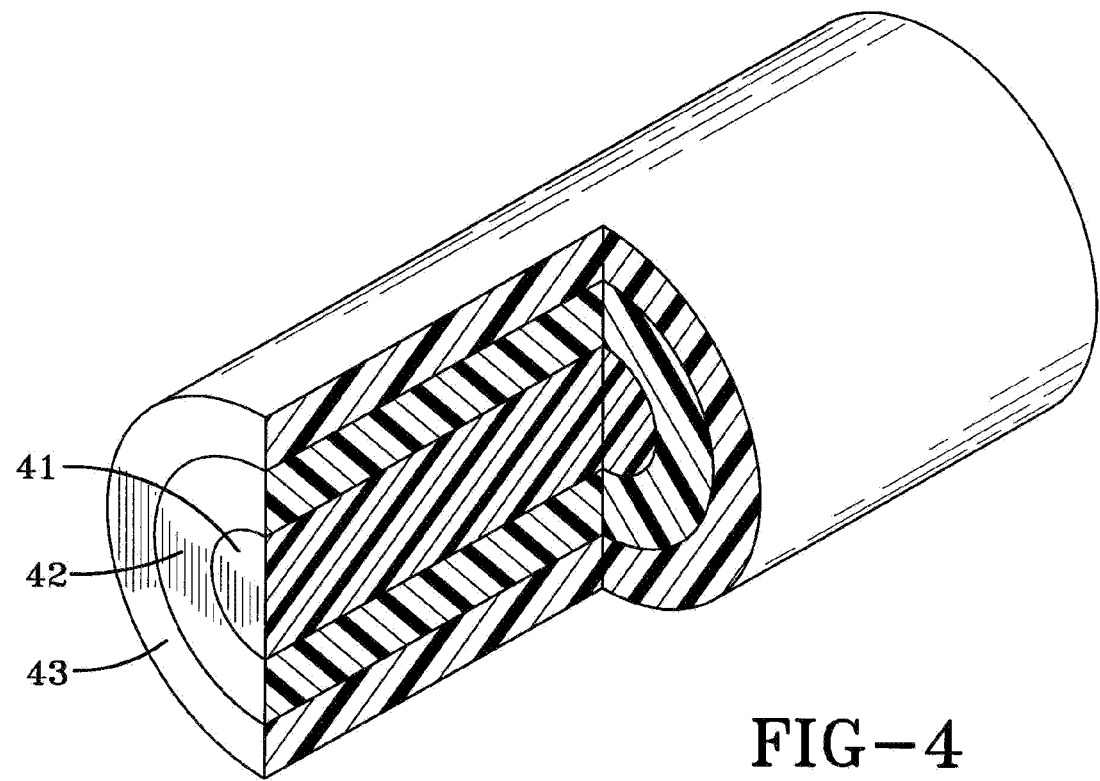
FIG. 4 depicts a resin pellet article of three compartmentalized zones configured in two concentric layers surrounding a core.

It is apparent to one skilled in the art that the strand could consist of more than two annular concentric layers. This would be accomplished by using another feeder and a different die. FIG. 4 depicts this chip having 3 compartmentalized zones having a core 41 which is comprised of the higher intrinsic viscosity thermoplastic wherein the core is encased by an intermediate layer 42 which is comprised of a material, which is in turn surrounded by an outer layer 43 which is comprised of the lower weight thermoplastic can also be used.

For cooling, a general cooling means is adopted. For example, a method for immersing the multilayer strand into cooling water in the water tank is adopted. The water-cooled multilayer strand is preferably sent to the cutter after moisture adhering to the surface removed by a water dripping device.

The cutter cuts the multilayer strand into a specified length by driving a rotary knife, or the like. In general, multilayer chips with outside diameter of about 2 to 8 mm are manufactured.

It needs to be recognized that absolute separation of the compartmentalized zones is not essential. The lack of absolute separation is true for all embodiments of the invention.

Figure 3:
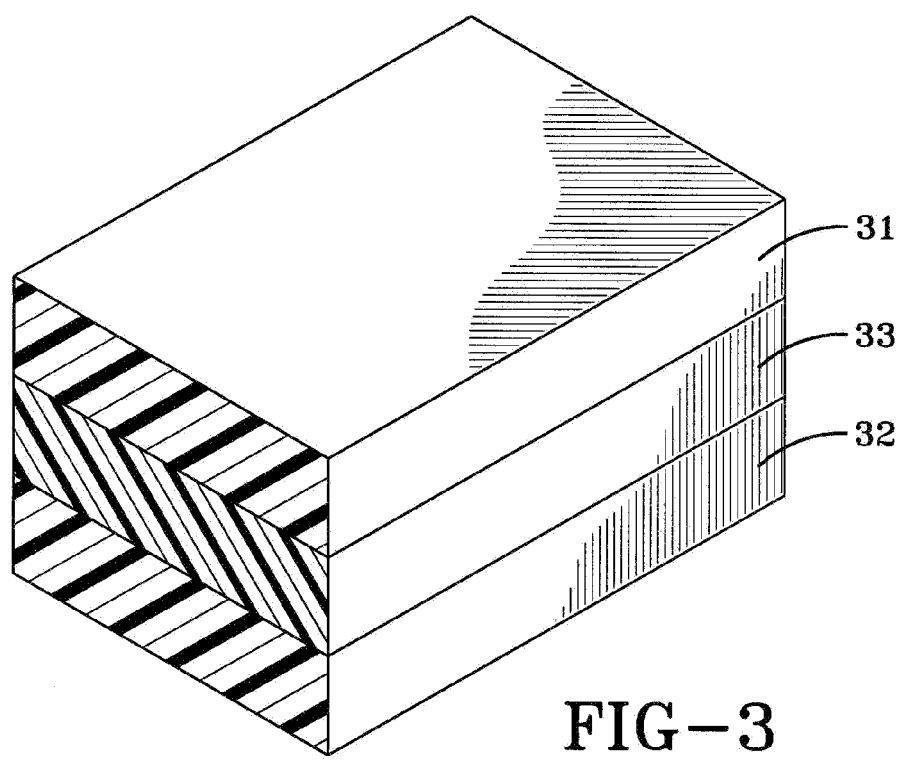
FIG. 3 depicts a resin pellet article with three compartments or zones in a multi-layered or sandwich configuration.

Another technique to make the compartmentalized chip is to cast the polyester polymer into layered sheets that are then cut in a cube form as well. The minimum structure is two layers, but the preferred structure for a cast structure of this invention is depicted in FIG. 3. In the sandwich or layered construction there are at least three layers wherein the middle layer 33 is sandwiched between a first outer layer 31 and a second outer layer 32.

The core zone or compartment is a compartment of which a portion lies between the centroid of the chip and the zone with the greatest surface exposed surface that touches the air. The centroid of the chip is the center of the plane passing through the chip perpendicular to the extrusion direction of the strand from which the chip is cut. Usually this will be the longest dimension of the chip. It should be obvious that for the sphere, any plane will suffice.

A suitable type of thermoplastic polymer includes any crystallizable sulfonated polyester polymer. The term crystallizable means that the thermoplastic polymer can be become semi-crystalline, either through orientation or heat induced crystallinity. It is well known that no plastic is completely crystalline and that the crystalline forms are more accurately described as semi-crystalline. The term semi-crystalline is well known in the prior art and is meant to describe a polymer that exhibits X-ray patterns that have sharp features of crystalline regions and diffuse features characteristic of amorphous regions. It is also well known in the art that semi-crystalline should be distinguished from the pure crystalline and amorphous states.

A crystallizable polymer will form crystals when the polymer is gradually cooled from the molten state. These crystals will generate diffraction observable by X-ray.

Preferably, the thermoplastic polymers used in the present invention comprise a sulfonated polyester polymer which means a homopolymer or copolymer such as polyethylene terephthalate or crystallizable copolymer of polyethylene terephthalate. For clarity, the terms crystallizable polyethylene terephthalate and group consisting of crystallizable polyethylene terephthalates, refers to polymers which are crystallizable and comprised of at least 85% polyethylene terephthalate repeating segments. The remaining 15% may be any other combination of acid-glycol repeating units, provided that the resulting polymer is capable of achieving a degree of crystallinity of at least 5%, more preferably 10%.

The term crystallizable polyester refers to polymer which is crystallizable and at least 85% of its acid moieties are selected from the group consisting of terephthalic acid, 2,6 naphthalene dicarboxylic acid or their respective di-methyl esters.

The useful polyester polymers are the phthalate and naphthalate polymers which means that acid moieties are derived from terephthalic acid, orthophthalic acid, isophthalic acid, 2,6 naphthalate dicarboxylic acid, or their respective dimethyl esters.

Regardless of the primary acid choice, at least some of the polyester polymer in the polyester phase is to be sulfonated.

One preferred crystallizable polyester is PET, which is the group of polyesters consisting of polyethylene terephthalate and copolymers of polyethylene terephthalate including copolymers of polyethylene terephthalate modified with metal salt of sulfoisophthalate derived from the di-ester or di-carboxylic acid of sulfoisophthalate (SIPA) in the approximately 1:1 stoichiometric reaction of acids, or their di-esters, with ethylene glycol.

Specific copolymers of interest are the crystallizable polyethylene terephthalates which have at least one sulfoisophthalate as an acid moiety and at least one other acid moiety derived from the comonomers selected from the group consisting of isophthalic acid or its diester, 2,6 naphthalene dicarboxylic acid or its diester, and cyclohexane dimethanol. The preferred sulfoisophthalate is lithium sulfoisophthalate with the levels of lithium sulfoisophthalate within the range of 0.05 and 2.0 mole percent based upon the acid moieties of the polyesters in the article.

Another preferred crystallizable polyester is polytrimethylene terephthalate (PTT). It can be prepared by, for example, reacting 1,3-propanediol with at least one aromatic diacid or alkyl ester thereof. Preferred diacids and alkyl esters include terephthalic acid (TPA) or dimethyl terephthalate (DMT). Accordingly, the PTT preferably comprises at least about 80 mole percent of either TPA or DMT. Other diols which may be copolymerized in such a polyester include, for example, ethylene glycol, diethylene glycol, 1,4-cyclohexane dimethanol, and 1,4-butanediol. In addition to the metal sulfonate such as the metal salt of sulfoisophthalic acid, other aromatic and aliphatic acids which may be used simultaneously to make a copolymer include, for example, isophthalic acid and sebacic acid.

Another preferred crystallizable polyester is polyethylene naphthalate, also known as PEN. It is made by the reaction of 2,6 naphthalene dicarboxylic acid or its diester(2,6 dimethyl naphthalate) with ethylene glycol.

It is also contemplated that the crystallizable polyester of the present invention may comprise recycled polyester or materials derived from post consumer or post industrial recycled polyester, such as polyester monomers, catalysts, and oligomers.

The polyester polymer could also be a mixture of unsulfonated polyester molecules and sulfonated polyester molecules.

It is essential for this invention that at least some of the polyester polymer molecules in the polyester polymer phase of the article contain at least one metal sulfonate which reduces the interfacial tension between the polyester and the polyamide. In order to understand the criticality of the metal sulfonate, it is necessary to understand the role of the metal sulfonate plays in the polyester-polyamide dispersion.

The polyester-polyamide dispersion can be described as a multi-phase system consisting of a dispersed polymer and a matrix phase polymer. The dispersed polymer is the discontinuous phase, with many small particles scattered throughout the matrix polymer. The matrix polymer is a continuous phase, where the polymer is not broken up into discrete units, but is constantly in contact with itself. In other words, there is usually only one matrix phase, but many particles of the dispersed polymer. Technically, therefore, the dispersed component may be considered many phases, as each particle is its own phase. However, in that description, each particle has the same equilibrium properties of the other particle. For the purposes of this invention, the term dispersed phase or dispersed polymer or the dispersed polymer phase refers to the totality of discrete particles of the discontinuous component present in the continuous phase.

The sulfonated polyester polymer will usually comprise metal sulfonate derived from a functionalized metal sulfonate. The term functionalized metal sulfonate to describe a compound of the form R—$SO_3M$, where M is the metal ion and R is an aliphatic, aromatic, or cyclic compound with at least one functional group that allows the functionalized metal salt to react with the polyester or its respective monomers or oligomers where M designates the metal ion. Functionalized metal sulfonates included in this invention are the lithium and sodium salts of sulfonated comonomers, including aliphatic and aromatic alcohols, carboxylic acids, diols, dicarboxylic acids, and multifunctional alcohols, carboxylic acids, amines and diamines. In contrast, non-functional metal sulfonates are those of the R—$SO_3M$, and R does not have functional group. The phrase metal sulfonate therefore refers to both functional and non-functional metal sulfonates. An example of this sulfonated polystyrene or polyolefins which are known to act as metal sulfonates in the polyester-polyamide systems.

In general, the metal sulfonate exists in functionalized form of the form X—R, where X is an alcohol, carboxylic acid or epoxy, most preferably a dicarboxylic acid or diol and R is R is —$SO_3M$, —COOM, —OM, —$PO_3(M)_2$, with M being a metal in a +1 or +2 valence state which can be selected from the group consisting of Li, Na, Zn, Sn, K and Ca and X—R is copolymerized into the polyester polymer to modify the interfacial tension. The amount of X—R needed will exceed 0.01 mole percent with respect to the total number of respective dicarboxylic acid or diol moles in the polymer composition. It is possible for X—R to include both a diol or dicarboxylic acid. In that case, the mole percent is based upon the total number of moles of respective diols, dicarboxylic acids, or polymer repeating units.

The functionalized metal sulfonate may contain 2 or more R groups. R is combined directly to the aromatic ring of X, which could be a diol, a dicarboxylic acid, or a side chain such as a methylene group. The following structure is an example,

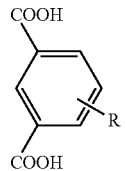

Where R is —$SO_3M$, —COOM, —OM, —$PO_3(M)_2$ with M designating a metal in a +1 or +2 valence state which can be selected from the group consisting of Li, Na, Zn, Sn, Ca and K. When R is —$SO_3M$, the compound is known as sulfonate, an organic sulfonate, or more specifically, sulfoisophthalic acid. If this entity is the metal sulfonate, then the polyester would contain acid units derived from a metal salt of sulfoisophthalic acid, wherein the metal can be selected from the group consisting of lithium, sodium, zinc, tin, calcium and potassium.

The dicarboxylic acids represented by X may be each ortha, meta, or para. They comprise for instance aromatic dicarboxylic acids such as terephthalic acid, isophthalic acid, orthophthalic acid, naphthalene dicarboxylic acid, diphenylether dicarboxylic acid, diphenyl-4,4-dicarboxylic acid etc.

X may also be aliphatic. In that event, aliphatic dicarboxylic acids such as oxalic acid, malonic acid succinic acid, glutaric acid, adipic acid, pimelic acid, suberic acid, azelaic acid, sebacic acid, etc. are suitable. Cycloaliphatic dicarboxylic acids such as cyclohexanedicarboxylic acid and one or more species of these can be used. Also included is isethionic acid. Specifically contemplated are mixtures of the dicarboxylic acids as well.

X can also represent an alcohol, preferably a diol of the structure:

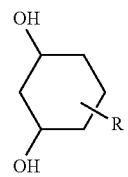

Where R is —$SO_3M$, —COOM, —OM, —$PO_3(M)_2$ where M is a metal in a +1 or +2 valence state which can be selected from the group consisting of Li, Na, Zn, Sn, K, and Ca.

The diols represented by X may also be aliphatic glycols such as ethylene glycol, 1,3 propanediol, 1,4-butanediol, 1,5-pentanediol, 1,6-hexanediol, 1,9-nonanediol, diethylene glycol, trimethylene glycol and cycloaliphatic diols such as cyclohexane diol, cyclohexanedimethanol and one or more species in combination can be used. Among these, ethylene glycol, diethylene glycol and cyclohexanediol are preferred.

Other functionalized metal sulfonates which can be used to decrease the interfacial tension include hydroxyl terminated polyethers, such as polyethylene glycol (Carbowax) and cyclic amides such as ethoxylated dimethyl hydantoin. In addition, polyesters can be reacted with epoxy terminated compounds, including epoxy terminated polyethers, to produce a polyether side chain attached to the polymer.

The following depicts Lithium sulfoisophthalic acid (Li-SIPA) or sulfonic acid lithium salt modified isophthalic acid.

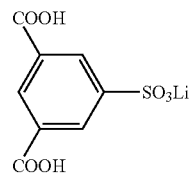

Of the salt forms, the di-carboxylic acid, di-ester, or pre-reacted low molecular weight oligomers such as the bis-hydroxyethyl ester of lithium sulfoisophthalate are preferred. It is also possible that the metal sulfonate, in this case the lithium sulfonate, occur in the diol form as well. Possible alternatives are ethylene glycol with the sulfonate group at the end of the pendant chain. It has even been proposed to place the sulfonate at the end of the polyester molecule. This can be accomplished by reacting or copolymerizing the polyester with the sulfonated salt of benzoic acid or other monofunctional species such as isethionic acid, either in the melt reactor or in an extruder.

In order to be reacted into, also known as copolymerized with, either polymer, the metal sulfonate must have at least one functional group. Examples of these functional groups are carboxylic acid (—COOH), alcohol (—OH), the ester of the carboxylic acid, epoxy termination, the diamine, or amine end groups.

The non-functionalized metal sulfonates are those compounds which contain the polar group, for example, the lithium salt, but do not have any functional end groups which allow the metal sulfonate to react with the polyester or polyamide. The lithium salt of sulfonated polystyrene is an example. In the three component system, the mole percent of the metal sulfonate is the mole percent based upon all the acid groups of the polyester.

As taught below, the polyester polymer is modified with the metal sulfonate. This modification is done by copolymerizing the metal sulfonate into the polymer chain.

The article can comprise the critical elements which exist in a two component form. In addition to the two critical components, other compounds may, of course, be present in the composition of the article. In one embodiment of the two component form, a metal sulfonate is copolymerized with the polyester polymer to make the polyester a sulfonated polyester copolymer.

The critical elements of the composition can also be present as more than two components. Again, in addition to the critical components, other compounds may, of course, be present in the composition. For instance, one embodiment is a polyester without a metal sulfonate copolymerized with the polymer, a polyester with a metal sulfonate copolymerized with the polymer, and the polyamide without a metal sulfonate copolymerized with the polyamide. Another embodiment is a polyester without a metal sulfonate copolymerized with the polymer, a polyester with a metal sulfonate copolymerized with the polymer, and a polyamide with a metal sulfonate copolymerized with the polyamide. Another embodiment is a polyester without a metal sulfonate copolymerized with the polymer, a polyester with a metal sulfonate copolymerized with the polymer, a polyamide with a metal sulfonate copolymerized with the polyamide and a polyamide without a metal sulfonate copolymerized with the polyamide.

For example, a typical homopolymer polyester has 100 mole percent terephthalate derived from terephthalic acid and almost 100 mole percent ethylene derived from ethylene glycol, with the remaining glycol being diethylene derived from diethylene glycol which is derived in situ during the manufacturing process. A 100 moles of polymer with 5 mole percent of the ionic dicarboxylic acid co-monomer, such as lithium sulfoisophthalic acid would contain 95 moles of terephthalate derived from terephthalic acid, 5 moles lithium sulfoisophthalate and approximately 100 moles of ethylene derived ethylene glycol. Similarly, it may be advantageous to use another comonomer such as isophthalic acid. For example, if one could substitute 2 moles of the terephthalate with 2 moles of isophthalate and create a polymer with 2 moles isophthalate, 93 moles terephthalate, 5 moles sulfoisophthalate and approximately 100 moles ethylene to make 100 moles of polymer repeat unit.

In the three component blend system, the moles of acid are the moles of acid in the sulfonated polyester polymer plus the moles of acid in the compatible unmodified polyester polymer. For example, if there were two polyesters present, one containing sulfoisophthalate, and the other did not, the mole percent of the sulfoisophthalate would be the moles of sulfoisophthalate divided by the moles of acid moieties of the two polyesters added together.

It is also well known that di-ethylene glycol is formed in-situ in the manufacture of polyester and about 1-3 percent of the total moles of glycol derived repeat unit will be diethylene derived from diethylene glycol. Therefore, the polyester compositions are typically 97 mole percent ethylene and 3 mole percent di-ethylene.

Typical levels for a metal sulfoisophthalate derived from the metal sulfoisophthalic acid are in the range of about 0.01 to about 15 mole percent, with the range of about 0.05 to about 10 mole percent being more preferred, with the range of about 0.1 to 5 mole percent also preferred, with the range of about 0.2 to about 4 mole percent and about 0.4 to about 2 mole percent also being good operational ranges. The amount of metal sulfonate is determined by measuring the amount of sulphur in the polymer and metal. For the case of the sulfonates belongin to the class of isophthalates, they can be described as being a metal sulfoisophthalate derived from the metal sulfoisophthalic acid or glycol, wherein the metal is selected from the group consisting of lithium, sodium, potassium, calcium, zinc, and manganese.

Polyesters modified with the metal sulfonate employed in the present invention can be prepared by polymerization procedures. The traditional techniques can be divided into the ester, acid, and modified processes. In the ester process, the dimethyl ester of the carboxylic acid or acids is reacted with the glycol or glycols in the presence of heat and the methanol removed yielding the bis-hydroxyethyl ester of the acids. The bis-hydroxyethyl ester is then polymerized in its liquid form by subjecting the material to vacuum and heat to remove the glycols and increase the molecular weight. A typical process for the object polymer with a metal sulfonate would start with these ratios: 98 moles of dimethyl terephthalate, 2 moles of dimethyl sodium salt of sulfoisophthalate and 220 moles of glycol, typically ethylene glycol. Of the 220 moles of glycol, 120 are excess which are removed during processing. It should be noted that it is possible to obtain the sulfonated co-monomer in either its bis-(hydroxyethyl) or dimethyl ester form.

For clarification, the phrase copolymerized with at least X percent of a specific acid means that the compound is considered as part of the acid group of the polymer, such as terephthalic or isophthalic acid. It provides the reference to determine how many moles of the compound to use. The phrase does not mean that the compound must be added to the process as an acid. For example, lithium sulfoisophthalic acid could be copolymerized into polyethylene terephthalate as the acid with two carboxylic end groups, as the dimethyl ester of the carboxylic acid, as the bis-hydroxy ester of the dimethyl ester, as very low molecular weight oligomers of a glycol acid polymer where the acid moieties are at least in part, the sulfoisophthalate salt, or as the di-alcohol.

The phrase "copolymerized salt of the acid" should not limit the claim to only using the acid form, but should be read to mean that the compound is one of the acid derived groups in the polymer.

The phrase "copolymerized with" means that the compound has been chemically reacted with the polymer, such as in the polymer chain or as a pendant group. For example, a polyester copolymerized with lithium sulfoisophthalate, or modified by copolymerizing at least 0.01 mole percent sulfoisophthalate into the polyester, means that sulfoisophthalate is bonded to the polymer, including bound into the polymer chain, with at least one chemical bond. The phrases are indifferent to how the material is incorporated into the polymer. A polyester copolymerized with lithium sulfoisophthalate, or modified by copolymerizing at least 0.01 mole percent lithium sulfoisophthalate into polyester refers to a polyester containing the lithium sulfoisophthalate whether that lithium sulfoisophthalate was incorporated using but not to limited to lithium sulfoisophthalic acid, lithium sulfobenzoic acid, the dimethyl ester of lithium sulfoisophthalic acid, the methyl ester of lithium sulfobenzoic acid, the di-alcohol of lithium sulfoisophthalate, the lithium sulfohydroxy benzene, the lithium salt of hydroxy benzene sulfonic acid, or oligomers or polymers containing the lithium sulfoisophthalate.

While the preceding paragraph used lithium as an example, the same would be true for the sodium and other metal salts. It should be noted that the references to lithium in this specification should not limit the claims to just the lithium salt. While lithium is the preferred metal, the use of the polyamides within the specified amino to carboxyl (acid) end group ratio has been effectively demonstrated with other metals as demonstrated in the examples.

The phrases "and derivatives" and "and its derivatives" refer to the various functionalized forms of the metal sulfonate salt which can be copolymerized into the polymer. For example, lithium sulfoisophthalate "and its derivatives" refers collectively and is not limited to lithium sulfoisophthalic acid, the dimethyl ester of lithium sulfoisophthalic acid, the bis-hydroxyethyl ester of lithium sulfoisophthalic acid, the di-alcohol of lithium sulfoisophthalate, low molecular weight oligomers, and high I.V. polymers containing lithium sulfoisophthalate in the polymer chain.

The same nomenclature applies to the glycol or alcohol containing the metal sulfonate.

In the acid process, the starting materials are the di-carboxylic acids, with water being the primary by-product. The charge ratio in a typical acid process is 98 moles terephthalic acid, 2 moles of a metal salt of sulfoisophthalic acid (e.g. lithium sulfoisophthalic acid—LiSIPA), and 120 moles of glycols, typical ethylene glycol. After reaction of the glycols with the acids, the material is subjected to the same polymerization process conditions as the ester process. In practice, many of the salts degrade and are therefore added in as a pre-reacted bis-hydroxy ester form.

The modified processes are variations of either process; combining the intermediary product at certain steps. For example, the acid process may be used with just terephthalic acid to produce its low molecular weight intermediate and the ester process used to produce the bis-hydroxyethyl ester of the homopolymer sulfonated polyester. These two intermediates are then combined and polymerized to a more random copolymer. Another variation is to add the finished modified polymer to the melt reactor and let the melt process depolymerise the modified polymer and then form a random copolymer. The three component system, of PET, sulfonated PET, polyamide and stabilizer is considered a part of this invention.

Another technique for manufacturing the modified polymer is to completely trans-esterify a modified polyester with a large amount of metal sulfonate moieties into a unmodified polyester to create a blockier copolymer. This can be done using other techniques such as a long residence time and/or high temperature extrusion.

The polyamides which could be modified or unmodified that are suitable for this invention can be described as those selected from the group consisting of the repeating unit of amino caproic acid or A-D, wherein A is the residue of a dicarboxylic acid comprising adipic acid, isophthalic acid, terephthalic acid, 1,4-cyclohexanedicarboxylic acid, resorcinol dicarboxylic acid, or naphthalenedicarboxylic acid, or a mixture thereof, and D is a residue of a diamine comprising m-xylylene diamine, p-xylylene diamine, hexamethylene diamine, ethylene diamine, or 1,4 cyclohexanedimethylamine, or a mixture thereof.

These polyamides can range in number average molecular weight from 2000 to 60,000 as measured by end-group titration. These polyamides can also be described as the reaction product of amino caproic acid with itself and/or the reaction product of a residue of dicarboxylic acid comprising adipic acid, isophthalic acid, terephthalic acid, 1,4-cyclohexanedicarboxylic acid, resorcinol dicarboxylic acid, or naphthalenedicarboxylic acid, or a mixture thereof with a residue of a diamine comprising m-xylylene diamine, p-xylylene diamine, hexamethylene diamine, ethylene diamine, or 1,4 cyclohexanedimethylamine, or a mixture thereof.

Those skilled in the art will recognize many of the combinations as well known commercially available polyamides. The reaction product of the residue of sebacic acid with hexamethylene diamine is nylon 6, 10 and the reaction product of the residue of adipic acid and hexamethylene diamine is nylon 6, 6. Nylon 6, 12 is another nylon which benefits from the invention. Nylon 6 is a special type of polyamide which is made by the opening of caprolactam and then polymerizing the resulting amino caproic acid which has a formula of $H_2N$—$(CH_2)_5$—COOH. One useful polyamide is the reaction product of the residues of adipic acid and m-xylylene diamine, known as poly-m-xylylene adipamide. This product is commercially known as MXD6 or nylon MXD6 and can be purchased from Mitsubishi Gas Chemical Company, Japan.

The preferred amount of polyamide is between 1 and 15 parts per 100 parts of the composition of the article, preferably between 3 and 8 parts per 100 parts of the composition of the article, with the most utility occurring between 4 and 7 parts of polyamide per 100 parts of the composition of the article. The amount of total polyester polymers should be at least 80% of the total weight of the article, with the weight percent of all components of the composition adding to 100%.

The stabilizer useful for this article can be capable of acting as free-radical scavenger.

This category includes phosphites having the formula $P(OR^1)_3$, where the radicals R1 are mutually identical or different and are alkyl or aryl groups, such as for example alkyl radicals with 8 or more carbon atoms, such as isooctyl, isodecyl, octadecyl, or aryl radicals such as phenyl and phenyl substituted with one or more alkyl groups, such as t.butyl-phenyl, di-t.butyl-phenyl, n-nonyl-phenyl and the like.

It is also possible to use phosphates having the formula $OP(OR^1)_3$, where R1 has the above mentioned meaning. Triarylphosphates are preferred.

Diphosphite compounds such as the compound marketed by General Electric Specialty Chemicals under the name "Ultranox 626" (CAS 26741-53-7) or "Ultranox 627" are particularly suitable thanks to the low yellow index of resins stabilized with these stabilizers.

Examples of triphosphites are triphenylphosphite and trioctadecylphosphite.

Other stabilizers which can be used are phenolic stabilizers, such as hindered phenolic compounds, for example the compound "Irganox 1010" by Ciba-Geigy, (CAS 6683-19-8) also known as Benzenepropanoic acid, or 3,5-bis(1,1-dimethylethyl)-4-hydroxy-, 2,2-bis((3-(3,5-bis(1,1-dimethylethyl)-4-hydroxyphenyl)-1-oxopropoxy)methyl)-1,3-propanediyl ester or Pentaerythritol tetrakis (3-(3',5'-di-tert-butyl-4'-hydroxyphenyl) or tetrakis(methylene-3.5-di-tert-butyl-4-hydroxy idrocinnamate).

Other Specific Stablizers Are

Irgafos 168® from CIBA, Switzerland (CAS 31570-04-4) known as (tris(2,4-di-(tert)-butylphenyl)phosphite);

Irgamod 195® (CAS 65140-91-2) known as calcium phosphonate available from CIBA, Switzerland;

Ultranox 626® (CAS 26741-53-7) known as bis(2,4-di-tert-butylphenyl)Pentaerythritol diphosphite available from Crompton Corporation, now Chemtura Corporation, Middlebury Conn., USA;

Nylostab® S-EED® (CAS 42774-15-2) also known as 1,3-benzenedicarboxaminde, N,N'-bis(2,2,6,6-tetramethyl-4-piperidinyl) available from Clariant GmbH, Germany Sandostab® P-EPQ, (CAS 119345-01-6) also known as tetrakis(2,4-di-tert-butylphenyl) 4,4-biphenyldiphosphonite available from Clariant GmbH, Germany;

Lowinox HD 98 (CAS 23128-74-7) also known as N,N'-Hexamethylene bis[3,5-di-tert-butyl-4-hydroxyphenyl) propionamide available from Great Lakes Chemical Corporation West Lafayette, Ind. USA (now Chemtura Corporation);

Lowinox GP 45 (CAS 36443-68-2) also known as triethyleneglycol-bis(3-(3-tert-butyl-4-hydroxy-5-methylphenyl) proprionate) available from Great Lakes Chemical Corporation West Lafayette, Ind. USA (now Chemtura Corporation);

Naugard® XL-1 (CAS 70331-94-1) also known as (1,2-Dioxoethylene)bis(iminoethylene)bis(3-(3,5-di-tert-butyl-4-hydroxyphenyl)propionate) available from Crompton Corporation, now Chemtura Corporation, Middlebury Conn., USA.

Better results were obtained when a portion of the stabilizer is present in the sulfonated polyester polymer phase. As demonstrated in the experimental section, placing the stabilizer only in the polyamide phase does not stop the color formation as much as having it in the polyester phase.

Levels of the stabilizer should be in the range of 100 parts stabilizer per million parts of article or composition to 10,000 parts stabilizer per million parts of the article or composition. It is believed that for good functionality, at least 2% of the total amount of the stabilizer should be present in the polyester polymer phase and the total amount of stabilizer should be in the range of 1000 to 6000 parts per million of the article, with 1200 to 3000 parts per million of the article being the most preferred. The composition does not have to be made in the bicomponent or multicomponent pellet technique demonstrated in the experimental section, but could be made by melt extruding all the ingredients at once or in stages.

EXPERIMENTAL

Commonalities

A poly(ethylene terephthalate) copolymer resin (a PET) was commercially produced via continuous melt polymerization, hereafter referred to as polyester. This polyester is commercially sold under the trademark Cleartuf® MAX. All studies used this resin as the base resin in which different regrind compositions were added to carry out the studies. Industry standard conditions were employed to dry the polyester in air at 177° C. for 6 hours. The mixture was then injection molded into preforms and ground. The ground preforms were mixed into the polyester, dried per the industry standards, and injection molded. Preforms were injection molded on an Arburg 420C (110 tons) using a 28 gram preform tool. Preform colors were measured using a HunterLab ColorQuest XE.

Comparative Example 1

The base polyester resin described above was melt mixed with approximately 3% nylon. The ground preforms from this mixture were mixed with the polyester base resin at a 10% level by weight. Preform colors measured between 3-4 b* Hunter Units. These results are recorded in Table I.

Comparative Example 2

A polyester resin was manufactured from 0.5 mol % of acid units LiSIPA and approximately 3% nylon by weight of polyester was mixed into the melt. This mixture was then dried per industry standards and injection molded into preforms and ground, as described in Commonalities. This regrind was added at a 10% level to the polyester base resin, described in Commonalities. The preform colors increased significantly from those of Example 1, from approximately 3-4 b* Hunter units, to 16-18 b* Hunter units. These results are summarized in Table I.

Example 3

The polyester of Example 2 was melt mixed with 3000 ppm Pentaerythitol Tetrakis (CAS number 6683-19-8) by weight of polyester, commercially referred to as Irganox® 1010, mixed into the melt. The same recycle study as described in Commonalities was employed. The preform colors showed a reduction of approximately 10 b* units when 3000 ppm of Pentaerythitol Tetrakis by weight of polyester was added. These results are summarized in Table I.

Example 4

The PET of Example 2 (PET containing 0.5 mol % of acid units LiSIPA) was extruded on an Arburg 420C using a compartmentalized pellet of core-shell design. The shell of the extruded pellet was comprised of the PET of Example 2 and 3000 ppm Pentaerythitol Tetrakis. The core of the pellet contained approximately 3% nylon and 3000 ppm Pentaerythitol Tetrakis by weight of the polyester. The bicomponent resin pellet was prepared with melt resin at the composition described and then solid stated to a higher IV. The same recycle study was repeated where the bicomponent PET was melted and injected into preforms and the regrind from these preforms was added to the base resin. In this case, 5% of the recycle was from post consumer recycle denoted as PCR and 5% was reground preforms of the bicomponent resin. These results are summarized in Table I.

Example 5

The PET of Example 2 (PET containing 0.5 mol % of acid units LiSIPA) was extruded on an Arburg 420C using a compartmentalized pellet of core-shell design. The shell of the extruded pellet was comprised of the PET of Example 2 and 100 ppm Pentaerythitol Tetrakis. The core of the pellet contained approximately 3% nylon by weight of the polyester and 3000 ppm Pentaerythitol Tetrakis by weight of the nylon. The bicomponent resin was prepared with melt resin at the composition described and then solid stated to a higher IV. The same recycle study was repeated where the bicomponent PET pellet was melted and injected into preforms and the regrind from these preforms was added to the base resin. In this case, 5% of the recycle was from post consumer recycle denoted as PCR and 5% was reground preforms of the bicomponent resin. The presence of the Pentaerythitol Tetrakis in the core did not significantly increase the b* of the resin or the preforms upon addition of the recycle as reground preforms. These results are summarized in Table I.

Example 6

Other stabilizers (antioxidants) were evaluated in a similar manner as the Pentaerythitol Tetrakis. The PET modified with 0.5 mol % LiSIPA as described in Example 2, was mixed with various stabilizers as well as 3% nylon in an Arburg extruder and injection molded into preforms. The preforms were ground and added to the PET as described in Commonalities at a 5% level. The following stabilizers were also evaluated: Irgafos 168® from CIBA, Switzerland (CAS 31570-04-4) known as (tris(2,4-di-(tert)-butylphenyl)phosphite), Irgamod 195® (CAS 65140-91-2) known as calcium phosphonate available from CIBA, Switzerland and Ultranox 626® (CAS 26741-53-7) known as bis(2,4-di-t-butylphenyl) Pentaerythritol diphosphite available from Crompton. The results are summarized in Table I.

different places. Upon completion of the test, the software is capable of displaying, saving, and printing an average and standard deviation for the requested customer defined scales and parameters.

We claim:

1. An article comprising a polyester polymer phase, a polyamide polymer and a stabilizer, wherein the polyester polymer phase is at least 80% by weight of the composition of the article and comprises a sulfonated polyester polymer comprising a metal sulfonate salt wherein the metal sulfonate is copolymerized into the polyester polymer phase, the metal sulfonate is in the form of X-R where X is selected from the group consisting of an alcohol, a carboxylic acid or an epoxy and R is selected from the group consisting of —$SO_3M$ where M is a metal in a +1 or +2 valence state,

TABLE I

Color Results of Recycled Preforms made from Various Regrind Compositions

| Example | Regrind Composition | | Regrind Source Preform Color | | | Color of Preforms Containing Regrind | | |
|---|---|---|---|---|---|---|---|---|
| | Polyester Type | Stabilizer | L* | A* | B* | L* | A* | B* |
| | | | Hunter units | | | Hunter units | | |
| 1 | PET mixed with 3% nylon | | 44.3 | −1.0 | −4.8 | 48.2 | −1.1 | 4.5 |
| 2 | PET modified with 0.5 mol % LiSIPA and mixed with 3% nylon | | 51.9 | 1.2 | −1.6 | 46.3 | −2.3 | 16.1 |
| 3 | PET modified with 0.5 mol % LiSIPA and mixed with 3% nylon | Irganox 1010 ® 3000 ppm | 52.6 | 1.3 | −2.0 | 48.7 | −1.5 | 6.8 |
| 4 | PET modified with 0.5 mol % LiSIPA and mixed with 3% nylon | Irganox 1010 ® 3000 ppm (in core & shell) | 51.5 | −0.4 | 7.2 | 49.2 | −0.8 | 3.9 |
| 5 | PET modified with 0.5 mol % LiSIPA and mixed with 3% nylon | Irganox 1010 ® 3000 ppm in core; 100 ppm in shell | 51.8 | 0.4 | 3.6 | 48.8 | −1.1 | 5.6 |
| 6 | PET modified with 0.5 mol % LiSIPA and mixed with 3% nylon | Irganox 1010 ® 3000 ppm | 51.8 | 1.2 | −1.6 | 49.5 | −0.5 | 1.8 |
| | | Irganox 1010 ®, 750 ppm and Irgafos 168 ® 1500 ppm | 52.6 | 1.7 | −3.0 | 49.4 | −0.7 | 3.1 |
| | | Irgamod 195 ® 1000 ppm | 52.3 | 1.6 | −2.6 | 48.9 | −0.7 | 3.2 |
| | | Ultranox 626 ® 2000 ppm | 43.5 | 1.1 | 2.8 | 49.2 | −0.6 | 2.4 |

Test Methods
HunterLab ColorQuest Test Method

The HunterLab ColorQuest XE Spectrocolorimeter Test Method was used to measure L*, a* and b* colors on the resin. Following the instruction manual, and using the appropriate specimen holder each sample is tested in four the polyamide polymer is a nylon and is present at a level of at least 1% by weight of the article, the stabilizer is present at a level of at least 100 parts stabilizer per million parts of the article and is present in the polyester polymer phase at least 2% by weight of the total amount of the polyester polymer phase, and said article is a compartmentalized pellet of a core-sheath structure having the polyester polymer phase in the sheath and the polyamide polymer in the core.

2. The article of claim 1, wherein the stabilizer is a hindered phenol or phosphate.

3. The article of claim 1, wherein the stabilizer is selected from the group consisting of pentaerythritol tetrakis(3,5-di-tert-buty-4-hydroxyhydro-cinnamate), (tris(2,4-di-(tert)-butylphenyl)phosphite), calcium phosphonate, bis(2,4-di-tert-butylphenyl) Pentaerythritol diphosphite, 1,3-benzenedicarboxaminde, N,N'-bis(2,2,6,6-tetramethyl-4-piperidinyl), tetrakis(2,4-di-tert-butylphenyl) 4,4-biphenyldiphosphonite, N,N'-Hexamethylene bis[3,5-di-tert-butyl-4-hydroxyphenyl)propionamide, triethyleneglycol-bis(3-(3-tert-butyl-4-hydroxy-5-methyphenyl)proprionate), and (1,2-Dioxoethylene)bis(iminoethylene)bis(3-(3,5-di-tert-butyl-4-hydroxyphenyl)propionate).

4. The article of claim 1, wherein the metal is selected from the group consisting of Li, Na, Zn, Sn, K and Ca.

5. The article of claim 4, wherein the stabilizer is a hindered phenol or phosphate.

6. The article of claim 4, wherein the stabilizer is selected from the group consisting of pentaerythritol tetrakis(3,5-di-tert-buty-4-hydroxyhydro-cinnamate), (tris(2,4-di-(tert)-butylphenyl)phosphite), calcium phosphonate, bis(2,4-di-tert-butylphenyl) Pentaerythritol diphosphite, 1,3-benzenedicarboxaminde, N,N '-bis(2,2,6,6-tetramethyl-4-piperidinyl), tetrakis(2,4-di-tert-butylphenyl) 4,4-biphenyldiphosphonite, N,N'-Hexamethylene bis[3,5-di-tert-butyl-4-hydroxyphenyl)propionamide, triethyleneglycol-bis(3-(3-tert-butyl-4-hydroxy-5-methyphenyl)proprionate), and (1,2-Dioxoethylene)bis(iminoethylene) bis(3-(3,5-di-tert-butyl-4-hydroxyphenyl)propionate).

* * * * *